(12) United States Patent
Lee et al.

(10) Patent No.: US 6,878,468 B2
(45) Date of Patent: Apr. 12, 2005

(54) COMPOUNDS CAPABLE OF TRANSPORTING/INJECTING HOLE AND ORGANIC ELECTROLUMINESCENT DEVICE HAVING SELF-ASSEMBLED MONOLAYER COMPRISING THE SAME

(75) Inventors: Jeong Ik Lee, Daejon (KR); Hye Yong Chu, Daejon (KR); Hyoyoung Lee, Daejon (KR); Ji Young Oh, Daejon (KR); Seong Hyun Kim, Daejon (KR); Lee-Mi Do, Daejon (KR); Taehyoung Zyung, Daejon (KR); Jaemin Lee, Daejon (KR); Byung-Jun Jung, Busan (KR); Hong-Ku Shim, Daejon (KR)

(73) Assignee: Electronics and Telecommunications Research Institute (KR)

(*) Notice: Subject to any disclaimer, the term of this patent is extended or adjusted under 35 U.S.C. 154(b) by 99 days.

(21) Appl. No.: 10/201,214

(22) Filed: Jul. 22, 2002

(65) Prior Publication Data

US 2003/0087127 A1 May 8, 2003

(30) Foreign Application Priority Data

Sep. 7, 2001 (KR) .......................... 2001-55046

(51) Int. Cl.[7] .............. B32B 19/00; B32B 9/00; H01J 1/62; H01J 63/04; C09K 11/06; C07F 7/02; C07F 7/04; C07F 7/10; C07F 7/00
(52) U.S. Cl. .............. 428/690; 428/917; 313/504; 313/506; 252/301.16; 250/40; 556/400; 556/413; 556/420; 556/465
(58) Field of Search .............. 428/690, 917; 313/504, 506; 252/301.16; 250/40; 556/400, 413, 420, 465

(56) References Cited

U.S. PATENT DOCUMENTS

| | | | | | |
|---|---|---|---|---|---|
| 5,688,961 | A | * | 11/1997 | Kushibiki et al. | 548/955 |
| 5,834,100 | A | * | 11/1998 | Marks et al. | 428/209 |
| 6,323,355 | B2 | * | 11/2001 | Igarashi | 556/431 |
| 6,339,221 | B1 | * | 1/2002 | Schubring et al. | 250/338.3 |
| 6,503,831 | B2 | * | 1/2003 | Speakman | 438/674 |
| 6,558,819 | B1 | * | 5/2003 | Igarashi | 428/690 |

FOREIGN PATENT DOCUMENTS

| | | |
|---|---|---|
| JP | 11-316468 | * 11/1999 |
| KR | 1999-014001 | 2/1999 |
| WO | WO 99/07028 | 2/1999 |

OTHER PUBLICATIONS

SPIE, vol. 4464, "Organic Light Emitting Materials and Devices V", 17 pages.
Wiley-VCH Verlag GmbH, D-69-469 Weinheim, 1999, "Self-Assembled Proceses for Organic LED . . . ", Joshua E. Malinsky, et al., 5 pages.

* cited by examiner

Primary Examiner—Rena Dye
Assistant Examiner—Camie S Thompson
(74) Attorney, Agent, or Firm—Blakely Sokoloff Taylor & Zafman (57) ABSTRACT

Provided are compounds having molecular components capable of transporting/injecting hole and an organic EL device having a self-assembled monolayer comprising the same. The compound has the following formula:

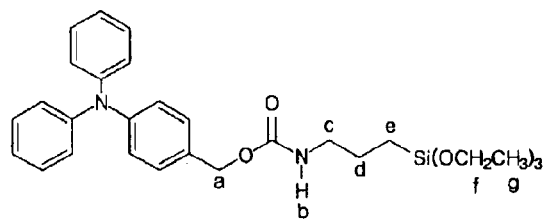

wherein Ar is a functional group having hole transporting or injecting capability, R is a $C_1$ to $C_{22}$ alkyl group, and X is an alkoxy group or halogen.

12 Claims, 6 Drawing Sheets

COMPOUNDS CAPABLE OF TRANSPORTING/INJECTING HOLE AND ORGANIC ELECTROLUMINESCENT DEVICE HAVING SELF-ASSEMBLED MONOLAYER COMPRISING THE SAME

BACKGROUND OF THE INVENTION

1. Field of the Invention

The present invention relates to organic compounds and an organic electroluminescent (EL) device, and more particularly, to compounds having molecular components capable of transporting/injecting hole and an organic EL device having a self-assembled monolayer comprising the same.

2. Description of the Related Art

In general, an organic EL device is formed by sequentially depositing a transparent electrode, a hole transport layer, a light emitting layer, an electron transport layer and a metal electrode on a substrate in a high vacuum. When the transparent electrode and the metal electrode are connected to positive (+) and negative (−) terminals of a power source, respectively, holes are supplied to the hole transport layer and the light emitting layer through the transparent electrode and electrons are supplied to the electron transport layer and the light emitting layer through the metal electrode. The holes and electrons supplied to the light emitting layer are combined in the light emitting layer to form excitons. The excitons drop to a ground state and generate light corresponding to a band gap of a light emitting polymer, thereby emitting light. Thus, when injected holes and electrons are balanced, the maximum luminescence efficiency can be exhibited. Since an organic EL device is quick at response speed and is of a spontaneous electroluminescence type, there is no need for back light, thereby attaining a lightweight, smaller device. Also, the organic EL device has several advantages such as excellent luminance and independence on an angle of field.

To date, various researches and suggestions to methods for improving the performance of organic EL devices have been made. In view of luminescent material preparation, new methods for providing high luminous efficiency and purity have been proposed. In view of device formation, researches into new structures of devices, cathode materials and improved ITO (indium tin oxide) film surface have been carried out. In particular, physically and chemically improving the surface of an ITO film considerably affects the performance of an organic EL device.

Changes in work function and surface roughness of an ITO substrate and a change in characteristics of an organic EL device according to surface treatment are described in J. Appl. Phys. Vol. 84, pp 6859–6870, in which surface treatment such as ITO substrate cleaning or plasma treatment is suitably performed to improve the performance of the device.

Also, formation of a self-assembled monolayer on an ITO surface using carboxylic acid is described in WO 99/07028, Adv. Mater., Vol. 11, pp 112–115, and Euro, Phys. J. B., Vol. 11, pp. 505–512. According to this method, the self-assembled monolayer can change a work function of ITO and can improve adhesion between an ITO surface and an organic film. In this method, the work function of ITO is changed according to the polarization direction of polar materials on the surface. However, the self-assembled monolayer using carboxylic acid is poor in view of stability against heat and stability over time.

Marks, et al. described that the performance of an organic EL device can be improved by spin-coating a hole transport material having 3 siloxanes or forming a thin film on an ITO surface by a self-assembled monolayer method, in U.S. Pat. No. 5,834,100, Adv. Mater., Vol. 11, pp 730–734, and Langmuir, Vol. 17, pp 2051–2054. However, according to this technique, since a compound having two or more silane groups is used, it is difficult to obtain a thin film having a uniform thickness, resulting in increased roughness.

SUMMARY OF THE INVENTION

It is an object of the invention to provide compounds capable of transporting/injecting holes so as to be applicable to an EL device having excellent adhesion between an anode substrate and an organic thin film and good stability against heat and time, and having a structure with which a thin film having a uniform thickness can be manufactured.

It is another object of the invention to provide an organic EL device with excellent electrical and optical characteristics.

To accomplish the first object of the present invention, there is provided a method compound of formula below:

wherein Ar is a functional group having hole transporting or injecting capability, R is a $C_1$ to $C_{22}$ alkyl group, and X is an alkoxy group or halogen.

In the compound according to the present invention, Ar has one formula selected from the group consisting of:

-continued wherein $R_1$, $R_2$ and $R_3$ are independently and individually represent a hydrogen atom, an amine group having two-aryl group or substituted aryl group, or a $C_1$ to $C_{22}$ alkyl group.

Preferably, the compound according to the present invention has the following structure wherein R' and R" are respectively a $C_1$ to $C_{22}$ alkyl group.

Preferably, Ar has a structure having triphenylamine. More preferably, the compound has the following formula:

wherein $R_1$ and $R_2$ are independently and individually represent a hydrogen atom, an amine group having two-aryl group or substituted aryl group, or a $C_1$ to $C_{22}$ alkyl or alkoxy group.

Preferably, Ar has a structure having carbazol. More preferably, the compound has the following formula:

wherein $R_1$ represents a hydrogen atom, an amine group having two-aryl group or substituted aryl group, or a $C_1$ to $C_{22}$ alkyl or alkoxy group.

For example, the compound may have the following formula:

In the compound of the present invention, R may include O, N, S, Si or Ge.

To accomplish the second object of the present invention, there is provided a an organic electroluminescent device including an anode, a hole transporting/injecting layer, an organic light-emitting layer, an electron transporting/injecting layer, a cathode, and a self-assembled monolayer interposed between the anode and the hole transporting/injecting layer and having the following formula:

Ar—R—SiX$_3$ wherein Ar is a functional group having hole transporting or injecting capability, R is a $C_1$ to $C_{22}$ alkyl group, and X is an alkoxy group or halogen.

In the present invention, the anode is indium tin oxide, indium oxide, tin oxide, zinc oxide or mixtures thereof. The self-assembled monolayer may include a single compound of the above formula, or two or more compounds of the above formula.

The compound according to the present invention includes molecular components having excellent hole transporting capability and a self-assembled monolayer having a uniform thickness formed on the substrate surface. The organic EL device according to the present invention has the self-assembled monolayer interposed between hole transporting/injecting layers comprised of a transparent electrode and an organic thin film. Thus, adhesion between the transparent electrode and the organic thin film can be enhanced, and holes can be smoothly transported or injected from the transparent electrode serving as an anode to the organic thin film. Also, excellent stability with respect to heat and time, excellent electrical characteristics and high luminous efficiency can be attained

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Important factors for improving electrical characteristics of an organic EL device include a cathode, an anode, an organic band positioned between the cathode and the anode, holes made of organic materials, electron transporting capacity, luminous efficiency of a light emitting layer, and physical adhesion between the two electrodes and an organic thin film. In particular, it is quite important to improve the physical adhesion between two electrodes and an organic thin film while adjusting the positional relationship therebetween.

In the organic EL device according to the present invention, in order to improve adhesion between an ITO film surface used as an anode and an organic thin film and to improve hole injecting capacity by changing a work function of the ITO film surface, an organic molecular monolayer having a compound represented by the formula 1 is formed on the ITO film:

[Formula 1]

wherein Ar denotes a functional group capable of transporting or injecting holes, for example, one selected from the group consisting of the following compounds represented by the formula 2:

[Formula 2]

wherein $R_1$, $R_2$, and $R_3$ are the same with or different from each other and independently hydrogen atom, amine group having two aryls or substituted aryls, or $C_1$–$C_{22}$ alkyl or alkoxy.

In Formula 1, R is $C_1$–$C_{22}$ alkyl group and can include O, N, S, Si or Ge, X is a functional group that can react with —OH group to form a self-assembled monolayer on the surface of an underlying layer to which —OH group is exposed and can be alkoxy group or halogen.

The compound according to the present invention having the structure represented by formula 1 is subjected to the following reaction scheme 1 in a solution of toluene, for example, to be adhered to the surface of an underlying layer, e.g., an ITO layer:

[Reaction scheme 1]

Since the compound according to the present invention includes a silane compound having molecular components capable of transporting and injecting holes, an organic EL device can be manufactured by forming a thin film made of the compound on an ITO layer, thereby improving the electrical characteristics, luminous characteristic and efficiency and stability of the organic EL device.

EXAMPLE 1

Synthesis of {[4-(diphenylamino)phenyl]methoxy}-N-(4,4,4-triethoxy-4-silabutic)formamide (to be referred to as "TPA-CONH-silane" hereinafter) was prepared in such a manner as represented by reaction scheme 2:

[Reaction scheme 2]

TPA—CONH—SILANE

EXAMPLE 1-1

Synthesis of 4-(diphenylamino)benzaldehyde 30 mL of dimethylformaldehyde (DMF) was put into a 250 mL flask, cooled to 0° C. and 3.8 mL of $POCl_3$ was slowly added thereto. Then, 10 g of triphenylamine was added to the resultant mixture and heated to 70° C. for 5 hours. The reaction container was cooled to room temperature and then a reactant solution was poured into ice water. Subsequently, 40 g of sodium acetate trihydrate was put for neutralization and then an organic layer was separated with methylenechloride. The obtained organic layer was dried using magnesium sulfate and methylenechloride was removed under reduced pressure, yielding a product. The product was recrystallized using methanol and a light yellow solid was finally obtained, yielding 73% of a desired product. Data of NMR spectra confirmed that the product had the same structure as 4-(diphenylamino)benzaldehyde, that is, the compound (1) in the reaction scheme 2.

EXAMPLE 1-2

Synthesis of [4-(diphenylamino)phenyl]methanol

The compound (1) obtained in Example 1-1, that is, 4-(diphenylamino)benzaldehyde, (4.2 g) was dissolved in 50 mL of ethanol and a solution prepared by dissolving 0.29 g of $NaBH_4$ in 0.1 M aqueous solution of NaOH (15 mL) was slowly added thereto. The reactant solution was reacted at room temperature for 4 hours. An organic layer was separated from the reactant solution using methylene chloride and recrystallized in a methylene chloride/hexane solvent, yielding 92% of a white solid. Data of NMR spectra confirmed that the product had the same structure as the compound (2) in the reaction scheme 2.

EXAMPLE 1-3

Synthesis of TPA-CONH-silane

Figure 1:
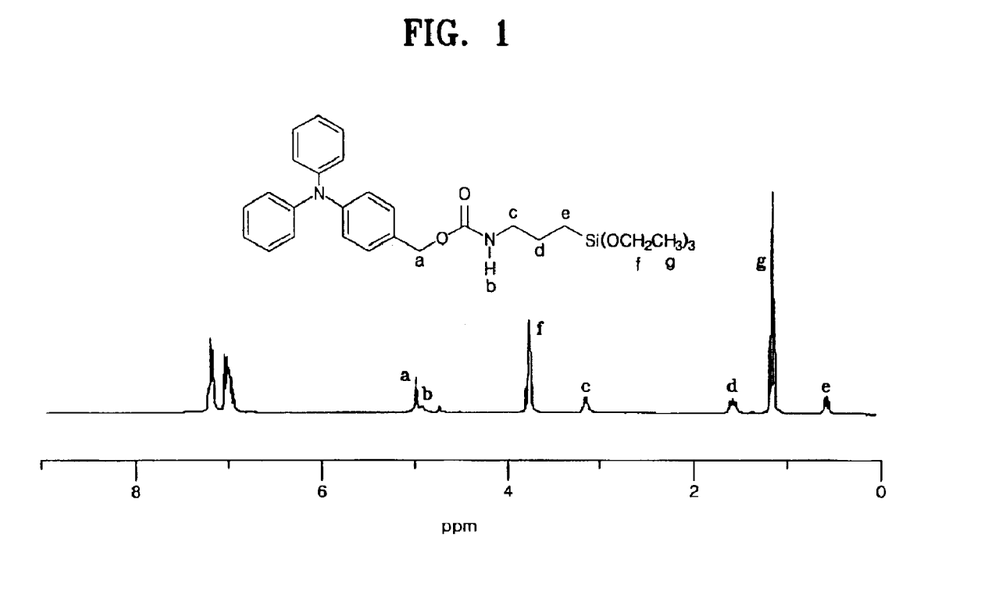
FIG. 1 is a proton NMR spectrum of a compound according to an embodiment of the present invention.

The compound obtained in Example 1-2, that is, [4-(diphenylamino)phenyl]methanol (10.0 g, 36.3 mmol), was dissolved in 30 mL of dimethylformamide, 10.3 mL (72.6 mmol) of triethylamine was added thereto and stirred for 30 minutes. Then, 3.5 mL (33 mmol) of (3-isocyanatopropyle)triethoxysilane was added and reacted at 70° C. for 48 hours. The resultant was concentrated under reduced pressure and then separated by column chromatography. The separated product was recrystallized using methylene chloride and hexane, yielding 44.4% of a white solid. Data of NMR spectra and elemental analysis confirmed that the product had the same structure as the compound (3) in the reaction scheme 2, that is, TPA-CONH-silane. FIG. 1 shows a proton NMR spectrum of the compound (3) of the reaction scheme 2.

EXAMPLE 2

Synthesis of [(9-ethylcarbazol-3-yl-methoxy)]-N-(4,4,4-triethoxy-4-silabutyl)formamide

[(9-ethylcarbazol-3-yl-methoxy)]-N-(4,4,4-triethoxy-4-silabutyl)formamide (to be referred to as "Car-CONH-silane" hereinafter) was prepared in such a manner as represented by reaction scheme 3:

[Reaction scheme 3]

-continued (5)

Car—CONH—SILANE

EXAMPLE 2-1

Synthesis of (9-ethylcarbazol-3-yl)methanol 20.0 g (87.8 mmol) of 9-ethyl-3-carbazolcarboxylaldehyde was dissolved in 250 mL of ethanol and a solution prepared by dissolving 1.64 g (44 mmol) of $NaBH_4$ in 43.9 mL of an aqueous solution of 0.2 M NaOH was slowly added thereto. The reactant solution was reacted at room temperature for 4 hours. An organic layer was separated from the reactant solution using methylene chloride and dried using magnesium sulfate. Then, methylene chloride was removed under reduced pressure and recrystallized using methylene chloride and hexane, yielding 93.7% of a white solid. Data of NMR spectra and elemental analysis confirmed that the product had the same structure as the compound (4) in the reaction scheme 3.

EXAMPLE 2-2

Figure 2:
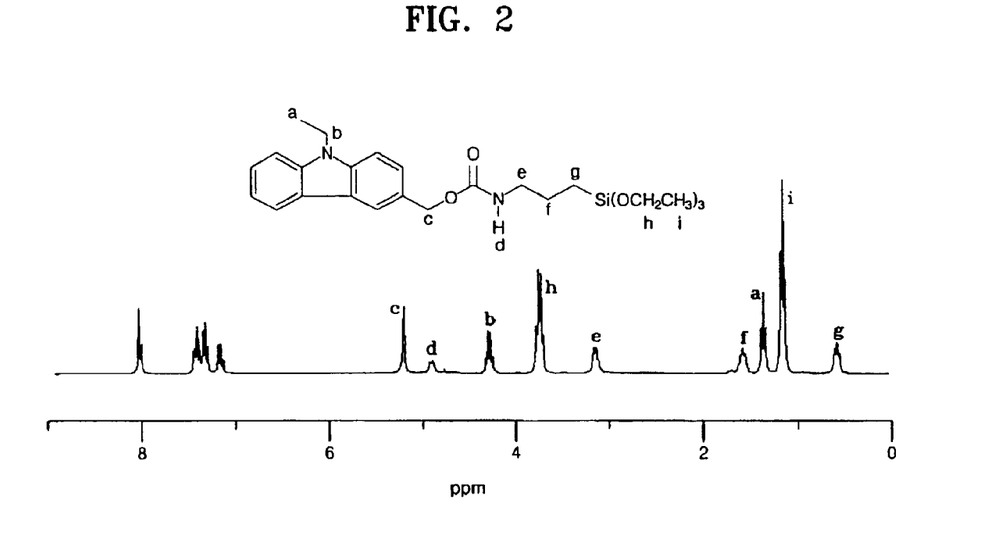
FIG. 2 is a proton NMR spectrum of a compound according to another embodiment of the present invention.

Synthesis of Car-CONH-silane 5 g (22.2 mmol) of the compound prepared in Example 2-1 was dissolved in 30.0 ml of dimethylformamide (DMF), 6.3 mL (45 mmol) of triethylamine ($NEt_3$) was added thereto and then stirred for 30 minutes. 5.2 mL (20 mmol) of (3-isocyanatopropyl)triethoxysilane was added to the resultant material and reacted at 70° C. for 48 hours. The reactant solution was cooled to room temperature and concentrated under reduced pressure. Then, purification was performed by column chromatography and recrystallization, yielding 52.2% of a compound (5) in the reaction scheme 3, that is, Car-CONH-silane. FIG. 2 shows a proton NMR spectrum of the compound (5) of the reaction scheme 3.

EXAMPLE 3

Synthesis of MeO-TPA-CONH-silane

{[4-(4'-methoxyphenyl-phenylamino)phenyl]methoxy}-N-(4,4,4-triethoxy-4-silabutic)formamide (to be referred to as "MeO-TPA-CONH-silane" hereinafter) was prepared in such a manner as represented by reaction scheme 4:

EXAMPLE 3-1

Synthesis of (4-methoxyphenyl)-diphenylamine 10 g of diphenylamine and 11 g of 4-methoxybromobenzene was dissolved in toluene (250 mL). NaO-t-Bu (5.3 g), $Pd_2(dba)_3$ (0.4 g), and $P(t-Bu)_3$ (0.5 g) were added to the above solution at room temperature. The reaction mixture was stirred at 100° C. for 12 hours under $N_2$. After cooling to room temperature, the mixture was quenched by adding aqueous ammonia (300 mL). An organic layer was separated from the reactant solution using methylene chloride and dried using magnesium sulfate. Then, methylene chloride was removed under reduced pressure and recrystallized using methylene chloride and hexane, yielding 70% of a white solid. Data of NMR spectra and elemental analysis confirmed that the product had the same structure as the compound (6) in the reaction scheme 4.

EXAMPLE 3-2

Synthesis of 4-(4'-methoxyphenyl-phenylamino) benzaldehyde 30 mL of dimethylformaldehyde (DMF) was put into a 250 mL flask, cooled to 0° C. and 3.8 mL of $POCl_3$ was slowly added thereto. Then, 10 g of compound (6) was added to the resultant mixture and heated to 70° C. for 5 hours. The reaction container was cooled to room temperature and then a reactant solution was poured into ice water.

Subsequently, 40 g of sodium acetate trihydrate was put for neutralization and then an organic layer was separated with methylenechloride. The obtained organic layer was dried using magnesium sulfate and methylenechloride was removed under reduced pressure, yielding a product. The product was recrystallized using methanol and a light yellow solid was finally obtained, yielding 70% of a desired product. Data of NMR spectra confirmed that the product had the same structure as 4-(4'-methoxyphenyl-phenylamino) benzaldehyde, that is, the compound (7) in the reaction scheme 4.

EXAMPLE 3-3
Synthesis of [4-(4'-methoxyphenyl-phenylamino)phenyl] methanol

The compound (7) obtained in Example 3-2, that is, 4-(4'-methoxyphenyl-phenylamino)benzaldehyde (4.7 g) was dissolved in 50 mL of ethanol and a solution prepared by dissolving 0.29 g of $NaBH_4$ in 0.1 M aqueous solution of NaOH (15 mL) was slowly added thereto. The reactant solution was reacted at room temperature for 4 hours. An organic layer was separated from the reactant solution using methylene chloride and recrystallized in a methylene chloride/hexane solvent, yielding 90% of a white solid. Data of NMR spectra confirmed that the product had the same structure as the compound (8) in the reaction scheme 4.

EXAMPLE 3-4
Synthesis of MeO-TPA-CONH-silane

The compound obtained in Example 3-3, that is, [4-(4'-methoxyphenyl-phenylamino)phenyl]methanol (11.0 g, 36.3 mmol), was dissolved in 30 mL of dimethylformamide, 10.3 mL (72.6 mmol) of triethylamine was added thereto and stirred for 30 minutes. Then, 3.5 mL (33 mmol) of (3-isocyanatopropyl)triethoxysilane was added and reacted at 70° C. for 48 hours. The resultant was concentrated under reduced pressure and then separated by column chromatography. The separated product was recrystallized using methylene chloride and hexane, yielding 44% of a white solid. Data of NMR spectra and elemental analysis confirmed that the product had the same structure as the compound (9) in the reaction scheme 4, that is, MeO-TPA-CONH-silane.

EXAMPLE 4
Synthesis of MeO2-TPA-CONH-silane

{[4-bis(4'-methoxyphenyl)amino]phenyl}methoxy}-N-(4,4,4-triethoxy-4-silabutic)formamide (to be referred to as "MeO2-TPA-CONH-silane" hereinafter) was prepared in such a manner as represented by reaction scheme 5:

EXAMPLE 4-1
Synthesis of Bis(4-methoxyphenyl)phenylamine 9 g of aniline and 9 g of 4-methoxy-bromobenzene was dissolved in toluene (250 mL). NaO-t-Bu (5.3 g), $Pd_2(dba)_3$ (0.4 g), and $P(t-Bu)_3$ (0.5 g) were added to the above solution at room temperature. The reaction mixture was stirred at 100° C. for 12 hours under $N_2$. After cooling to room temperature, the mixture was quenched by adding aqueous ammonia (300 mL). An organic layer was separated from the reactant solution using methylene chloride and dried using magnesium sulfate. Then, methylene chloride was removed under reduced pressure and recrystallized using methylene chloride and hexane, yielding 65% of a white solid. Data of NMR spectra and elemental analysis confirmed that the product had the same structure as the compound (10) in the reaction scheme 5.

EXAMPLE 4-2
Synthesis of 4-bis(4'-methoxyphenyl)aminobenzaldehyde 30 mL of dimethylformaldehyde (DMF) was put into a 250 mL flask, cooled to 0° C. and 3.8 mL of $POCl_3$ was slowly added thereto. Then, 10 g of compound (10) was added to the resultant mixture and heated to 70° C. for 5 hours. The reaction container was cooled to room temperature and then a reactant solution was poured into ice water. Subsequently, 40 g of sodium acetate trihydrate was put for neutralization and then an organic layer was separated with methylenechloride. The obtained organic layer was dried using magnesium sulfate and methylenechloride was removed under reduced pressure, yielding a product. The product was recrystallized using methanol and a light yellow solid was finally obtained, yielding 73% of a desired product. Data of NMR spectra confirmed that the product had the same structure as 4-(bis(4'-methoxyphenyl)amino) benzaldehyde, that is, the compound (11) in the reaction scheme 5.

EXAMPLE 4-3
Synthesis of [4-bis(4'-methoxyphenyl)aminophenyl] methanol

The compound (11) obtained in Example 4-2, that is, 4-(bis(4'-methoxyphenyl)amino)benzaldehyde (5.1 g) was dissolved in 50 mL of ethanol and a solution prepared by dissolving 0.29 g of $NaBH_4$ in 0.1 M aqueous solution of NaOH (15 mL) was slowly added thereto. The reactant solution was reacted at room temperature for 4 hours. An organic layer was separated from the reactant solution using methylene chloride and recrystallized in a methylene chloride/hexane solvent, yielding 92% of a white solid. Data of NMR spectra confirmed that the product had the same structure as the compound (12) in the reaction scheme 5.

EXAMPLE 4-4
Synthesis of MeO2-TPA-CONH-silane

The compound obtained in Example 4-3, that is, [4-bis (4'-methoxyphenyl)aminophenyl]methanol (12.0 g, 36.3 mmol), was dissolved in 30 mL of dimethylformamide, 10.3 mL (72.6 mmol) of triethylamine was added thereto and stirred for 30 minutes. Then, 3.5 mL (33 mmol) of (3-isocyanatopropyle)triethoxysilane was added and reacted at 70° C. for 48 hours. The resultant was concentrated under reduced pressure and then separated by column chromatography. The separated product was recrystallized using methylene chloride and hexane, yielding 40% of a white solid. Data of NMR spectra and elemental analysis confirmed that the product had the same structure as the compound (13) in the reaction scheme 5, that is, MeO2-TPA-CONH-silane.

EXAMPLE 5
Preparation of a Self-assembled Monolayer (1)

Silicon wafers each having a <100> crystal growth orientation were washed with chloroform and water and treated in a solution having concentrated sulfuric acid and $H_2O_2$ (35%) mixed in a volume ratio of 7:3 at 120° C. for 10 minutes. Thereafter, the resultant structures were added to a solution having $NH_4OH$ (35%), $H_2O_2$ and $H_2O$ mixed in a volume ratio of 1:1:5 and treated at 80° C. for 20 minutes. Then, the wafers were washed with water and dried with nitrogen gas. Each of the prepared wafers was immersed in toluene solutions having the compound synthesized in Example 1-3, that is, TPA-CONH-silane, and the compound synthesized in Example 2-2, that is, Car-CONH-silane, dissolved in a concentration of 1 mM, respectively, and reacted at room temperature for 24 hours. After completion of the reaction, the silicon wafers were washed with an acetone solvent and finally washed with water. Then, the washed wafers were dried with dry nitrogen gas, thereby forming a self-assembled monolayer comprised of the compound synthesized in Example 1-3, that is, TPA-CONH-silane, and the compound synthesized in Example 2-2, that is, Car-CONH-silane, on each silicon wafer

EXAMPLE 6
Preparation of a Self-assembled Monolayer (2)

ITO substrates were washed with chloroform and water and added to a solution having $NH_4OH$ (35%), $H_2O_2$ and $H_2O$ mixed in a volume ratio of 1:1:5 and treated at 80° C. for 20 minutes. Then, the ITO substrates were finally washed with water and dried with dry nitrogen gas.

Each of the prepared substrates was immersed in a toluene solution having the compound synthesized in Example 1-3, that is, TPA-CONH-silane, and the compound synthesized in Example 2-2, that is, Car-CONH-silane, dissolved in a concentration of 1 mM, respectively, and reacted at room temperature for 24 hours. After completion of the reaction, the ITO substrates were washed with an acetone solvent and finally washed with water. Then, the washed wafers were dried with dry nitrogen gas, thereby forming a self-assembled monolayer comprised of the compound synthesized in Example 1-3, that is, TPA-CONH-silane, and the compound synthesized in Example 2-2, that is, Car-CONH-silane, on each ITO substrate.

EXAMPLE 7
Evaluation of Self-assembled Monolayers (1)
Thickness of Self-assembled Monolayers The thicknesses of the self-assembled monolayers prepared in Example 3 were measured using an ellipsometer. The measurement results showed that the self-assembled monolayer comprised of the compound synthesized in Example 1-3, that is, TPA-CONH-silane, and the self-assembled monolayer comprised of the compound synthesized in Example 2-2, that is, Car-CONH-silane, had thicknesses in the range of 10 to 20 Å.

Figure 3:
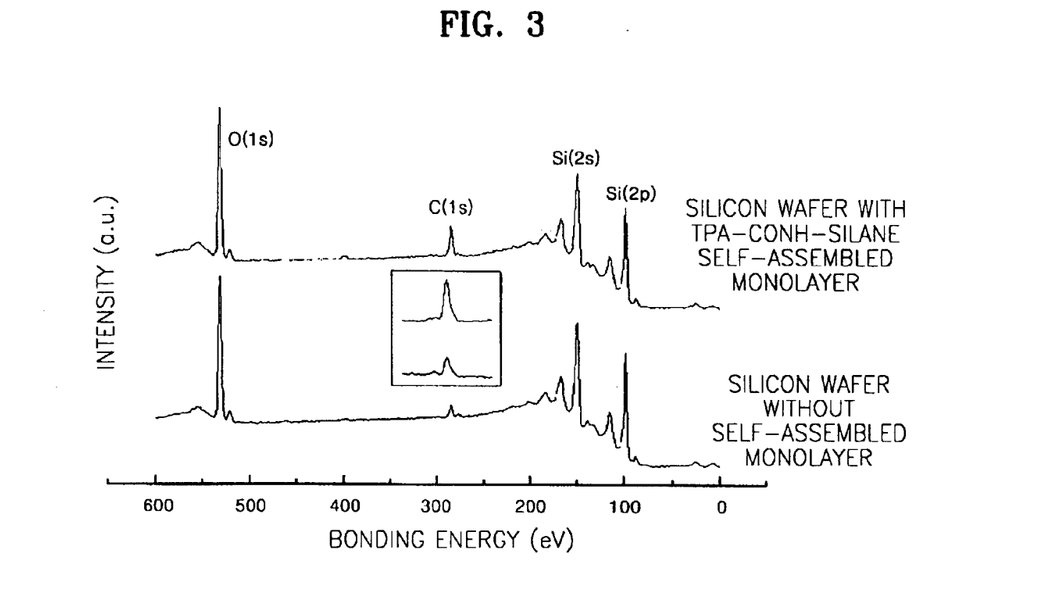
FIG. 3 is an XPS spectrum of a self-assembled monolayer having the compound according to an embodiment of the present invention.
Figure 4:
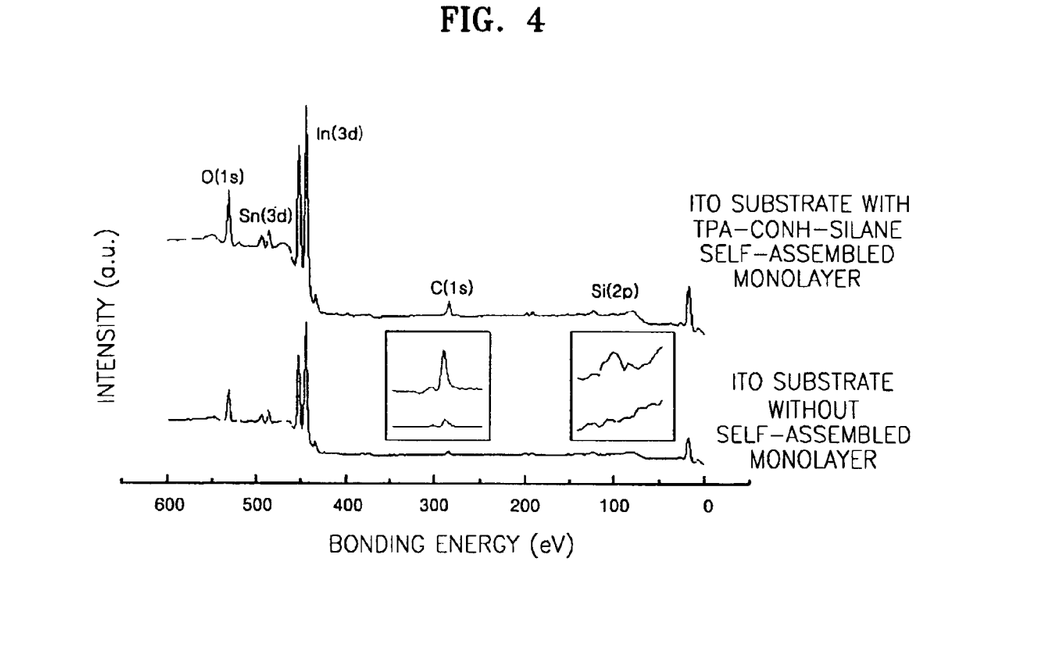
FIG. 4 is an XPS spectrum of a self-assembled monolayer having the compound according to another embodiment of the present invention.

EXAMPLE 8
Evaluation of Self-assembled Monolayers (2)
XPS Spectrum of Self-assembled Monolayers Elements of the self-assembled monolayers formed on the silicon wafers and the ITO substrates were analyzed using X-ray Photo-electron Spectroscopy (XPS). The self-assembled monolayer comprised of the compound synthesized in Example 1–3, that is, TPA-CONH-silane, was used for analysis. FIG. 3 shows an XPS spectrum of the self-assembled monolayer comprised of TPA-CONH-silane formed on a silicon wafer, and FIG. 4 shows an XPS spectrum of the self-assembled monolayer comprised of TPA-CONH-silane formed on an ITO substrate. FIGS. 3 and 4 show observation results of peaks indicating characteristics of the respective self-assembled monolayers with respect to C, N and Si, respectively.

Figure 5:
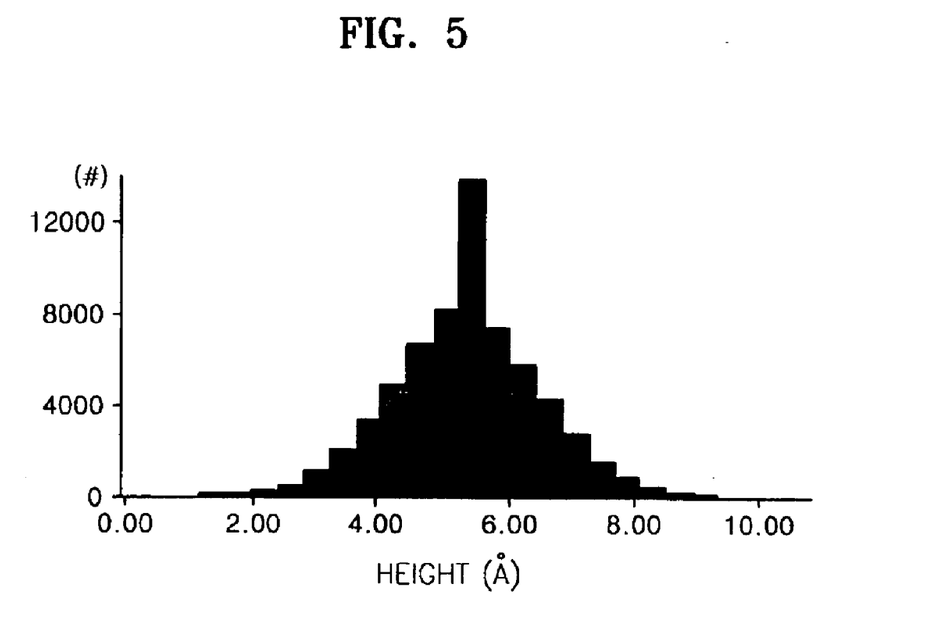
FIG. 5 is a histogram showing the measurement result of the surface roughness of the self-assembled monolayer having the compound according to an embodiment of the present invention.

EXAMPLE 9
Evaluation of Self-assembled Monolayers (3)
Surface Roughness of Self-assembled Monolayers The surface roughness of a TPA-CONH-silane self-assembled monolayer formed on a silicon wafer was analyzed using atomic force microscope (AFM), and the results thereof are shown in FIG. 5. The analysis results of FIG. 5 were evaluated by a root mean square (RMS) method, resulting in roughness of 1.21 Å.

Figure 6:
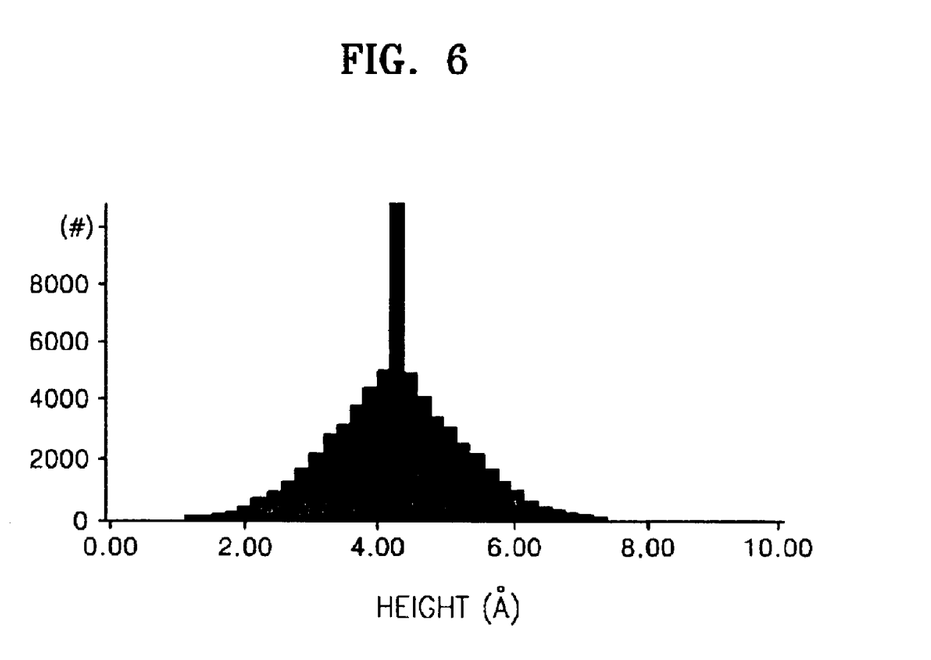
FIG. 6 is a histogram showing the measurement result of the surface roughness of a silicon wafer without a self-assembled monolayer.

In Comparison Example, the surface roughness of a silicon wafer without a self-assembled monolayer was analyzed, and the results thereof are shown in FIG. 6. The analysis results of FIG. 6 were evaluated by RMS, resulting in roughness of 1.03 Å.

FIGS. 5 and 6 show that substantially the same roughness was observed before and after forming the TPA-CONH-silane self-assembled monolayer on a silicon wafer.

EXAMPLE 10
Evaluation of Self-assembled Monolayer (4)
Work Function of Self-assembled Monolayer The work function of each of a TPA-CONH-silane self-assembled monolayer and a Car-CONH-silane self-assembled monolayer was measured using an atmospheric type ultraviolet spectrometer (model AC-2; Riken Keiki). As a result, the work function of 5.3 eV, higher than that of ITO substrate surface, i.e., 4.8 eV, was obtained in both the two self-assembled monolayers. This confirms that the TPA-CONH-silane self-assembled monolayer and the Car-CONH-silane self-assembled monolayer can smoothly perform electron injection between the electron transporting layer and the ITO substrate.

EXAMPLE 11
Evaluation of Self-assembled Monolayer (5)
Contact Angle of Water at Self-assembled Monolayer In order to evaluate hydrophilicity and hydrophobicity of a self-assembled monolayer comprising the compound according to the present invention, water contact angles were measured on the TPA-CONH-silane self-assembled monolayer and the Car-CONH-silane self-assembled monolayer formed on silicon wafers, respectively. Also, in Comparison Example, the water contact angle was measured for the silicon wafer surface without a self-assembled monolayer. As a result, whereas the water contact angle for the silicon wafer surface without a self-assembled monolayer was less than 15 degrees, the water contact angles for the silicon wafer surfaces with the TPA-CONH-silane self-assembled monolayer and the Car-CONH-silane self-assembled monolayer were approximately 77 and 74 degrees, respectively. In other words, the resulting surfaces with the TPA-CONH-silane self-assembled monolayer and the Car-CONH-silane self-assembled monolayer formed on the silicon wafers were more hydrophobic than the silicon wafer surface, confirming that these surfaces could provide for good adhesion to another layer materials.

EXAMPLE 12
Evaluation of Self-assembled Monolayer (6)
Thermal Stability of Organic Film Formed on Self-assembled Monolayer In order to evaluate thermal stability of an organic film formed on a self-assembled monolayer comprising the compound according to the present invention, the self-assembled monolayer comprising the compound according to the present invention was formed on an ITO substrate, and a triphenyldiamine (TPD) layer as a hole transporting layer was then formed thereon to a thickness of 500 Å by vacuum deposition. Here, samples of self-assembled monolayers formed of TPA-CONH-silane and Car-CONH-silane were prepared, respectively. Also, comparative samples of TPD layers directly formed on ITO substrates without a self-assembled monolayer to a thickness of 500 Å, were prepared.

The thus-prepared samples were heat-treated under inert gas (nitrogen) atmosphere at 150° C. for 3 hours. After heat treatment, scanning electron microscope (SEM) analysis performed on TPD layers of the respective samples showed that the TPD layers formed on the respective ITO substrates with the TPA-CONH-silane self-assembled monolayer and the Car-CONH-silane self-assembled monolayer maintained the same shape, without any change, before and after heat treatment. However, in the case where the ITO substrate without a self-assembled monolayer, the observation result showed that the TPD layer could not maintain its original shape but an island-shaped domain was discontinuously formed. These findings confirm that adhesiveness between an ITO substrate and a TPD layer is increased by forming a self-assembled monolayer comprising the compound according to the present invention therebetween.

EXAMPLE 13
Manufacture of Organic Electroluminescent Device

Figure 7:
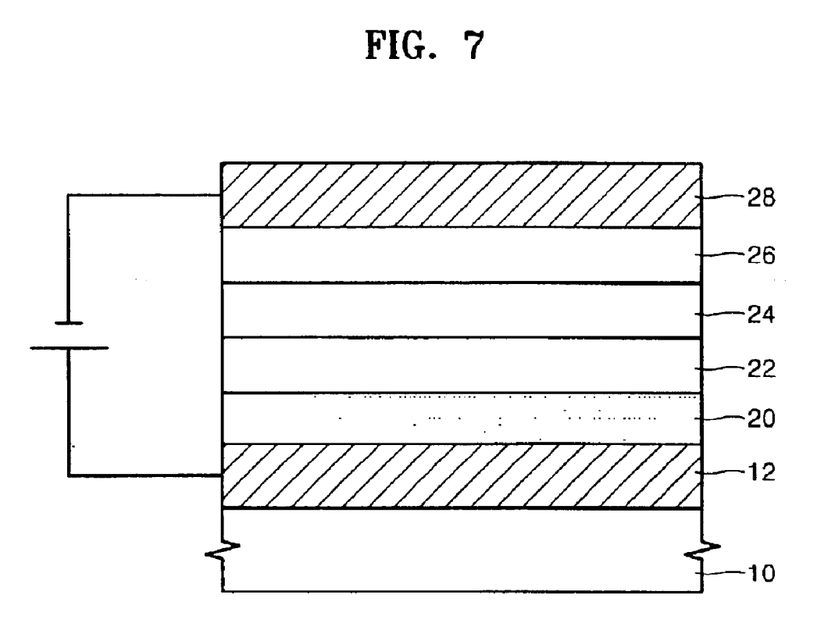
FIG. 7 is a cross-sectional view of an organic EL device according to an embodiment of the present invention.

The compounds prepared in Examples 1-3 and 2-2 were used in manufacturing organic electroluminescent devices. In detail, referring to FIG. 7, a self-assembled monolayer 20 was formed on a glass substrate 10 having transparent electrode 12 made of ITO in the same manner as in Example 4. monolayers of the TPA-CONH-silane and the Car-CONH-silane synthesized in Examples 1-3 and 2-2 were used as the self-assembled monolayer 20, and the thickness thereof was in the range of 10 to 20 Å. Thereafter, a hole transporting/injecting layer 22, a light emitting layer 24, an electron transport/injection layer 26 and a metal electrode 28 are sequentially formed on the self-assembled monolayer 20. In this embodiment, an approximately 500 Å thick TPD layer was formed as the hole transporting/injecting layer 22, and an approximately 600 Å thick A $1Q_3$ (tris(8-quinolinolato) aluminum ) layer was formed as the hole transporting/injecting layer 2. In other words, the electron transporting/injecting layer 26 made of $AlQ_3$ also serves as the light-emitting layer 24. The $AlQ_3$ layer was formed by evaporation performed at a pressure of $10^{-6}$ torr. As the metal electrode 28, an Al layer was formed to a thickness of approximately 700 Å. Also, in this embodiment, a buffer layer (not shown) made of LiF was interposed between the $AlQ_3$ layer, i.e., the electron transporting/injecting layer 26, and the metal electrode 28 to a thickness of approximately 20 Å.

Although only particular embodiments have been described, the substrate 10 may be formed of polycarbonate, polyimide, polyethyleneterephthalate or polyethylenenaphthalate, in addition to glass. Also, the transparent electrode 12 constitutes an anode of an organic electroluminescent device, and may be formed of indium oxide, tin oxide, zinc oxide or mixtures thereof mixed in an appropriate ratio according to desired transmittance and conductivity, in addition to the above-referenced ITO. Further, the transparent electrode 12 may be formed by sputtering. The self-assembled monolayer 20 is formed for the purpose of improving adhesiveness between the transparent electrode 12 and the hole transporting/injecting layer 22 while improving the capabilities of transporting and injecting holes, and may be formed of a single compound or a mixture of two or more compounds.

Figure 8:
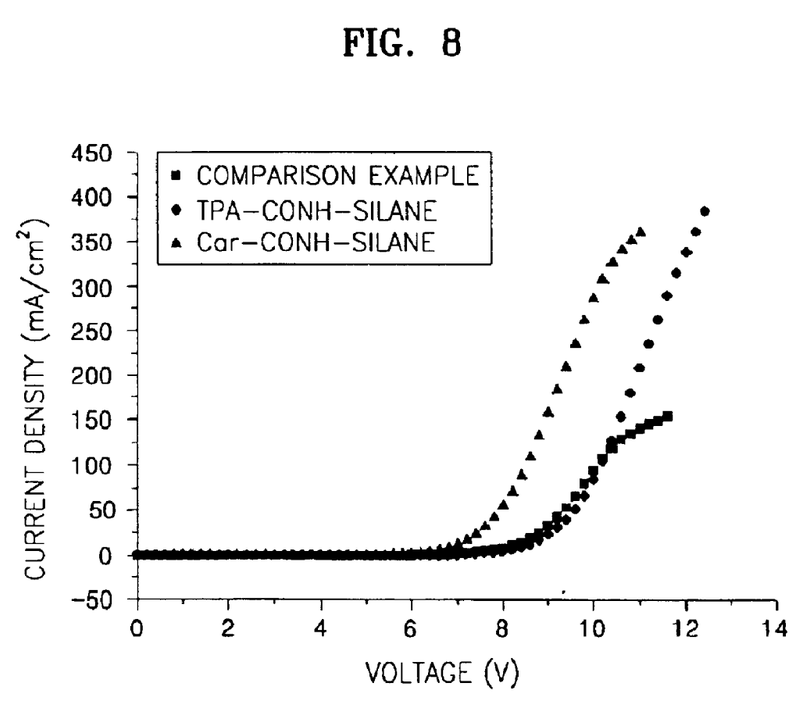
FIG. 8 is a graph showing the evaluation of electrical characteristics of the organic EL device according to an embodiment of the present invention.

EXAMPLE 14
Evaluation of Organic Electroluminescent Device (1)
Electrical Properties The electrical properties of the organic electroluminescent device prepared in Example 11 were evaluated. FIG. 8 shows the evaluation results of electrical properties of organic electroluminescent devices with the self-assembled monolayer 20 formed of the TPA-CONH-silane compound prepared in Example 1-3, marked by ●, and the Car-CONH-silane compound prepared in Example 2-2, marked by ▲, respectively, and without the self-assembled monolayer 20 as in Comparison Example, marked by ■ . As shown in FIG. 8, a high current density can be acquired even at a low voltage, by forming the self-assembled monolayer 20 between the transparent electrode 12 and the hole transporting/injecting layer 22, thereby improving the electrical properties of the organic electroluminescent device. In particular, in the case where the self-assembled monolayer 20 is formed of the Car-CONH-silane prepared in Example 2-2, very good electrical properties were obtained.

EXAMPLE 15
Evaluation of Organic Electroluminescent Device (2)
Luminance

Figure 9:
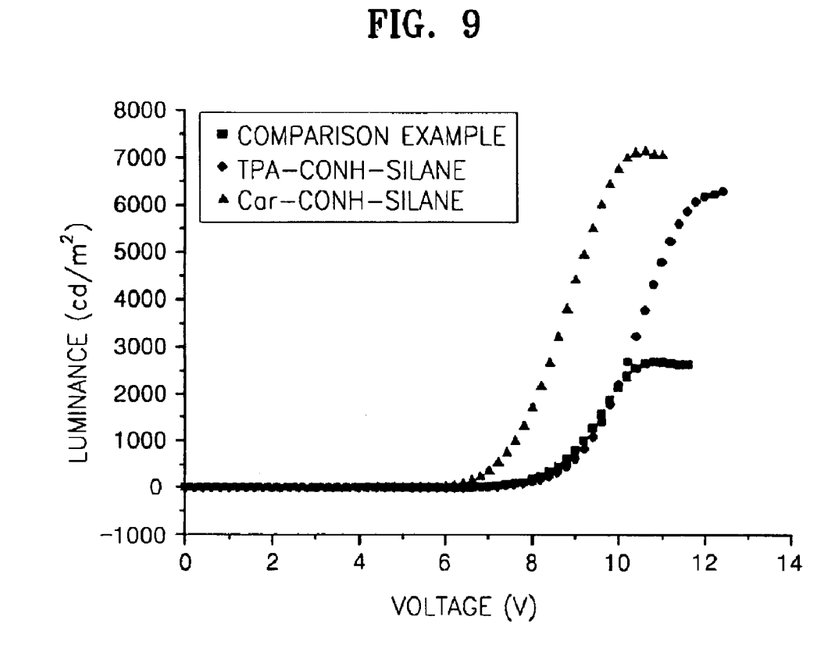
FIG. 9 is a graph showing the evaluation of electroluminescence of the organic EL device according to an embodiment of the present invention.

The electroluminescent properties of the organic electroluminescent device prepared in Example 11 were evaluated. FIG. 9 shows the evaluation results of applied voltage-dependent luminance of organic electroluminescent devices with the self-assembled monolayer 20 formed of the TPA-CONH-silane compound prepared in Example 1-3, marked by ●, and the Car-CONH-silane compound prepared in Example 2-2, marked by ▲, respectively, and without the self-assembled monolayer 20 as in Comparison Example, marked by ■. As shown in FIG. 9, high luminance can be acquired even at a low voltage, by forming the self-assembled monolayer 20 between the transparent electrode 12 and the hole transporting/injecting layer 22, thereby improving the electrical properties of the organic electroluminescent device. In particular, in the case where the self-assembled monolayer 20 is formed of the Car-CONH-silane prepared in Example 2-2, very high luminous efficiency, that is, approximately twice the maximum luminance of that in Comparison Example, was obtained.

EXAMPLE 16

Evaluation of Organic Electroluminescent Device (3) Performance

Figure 10:
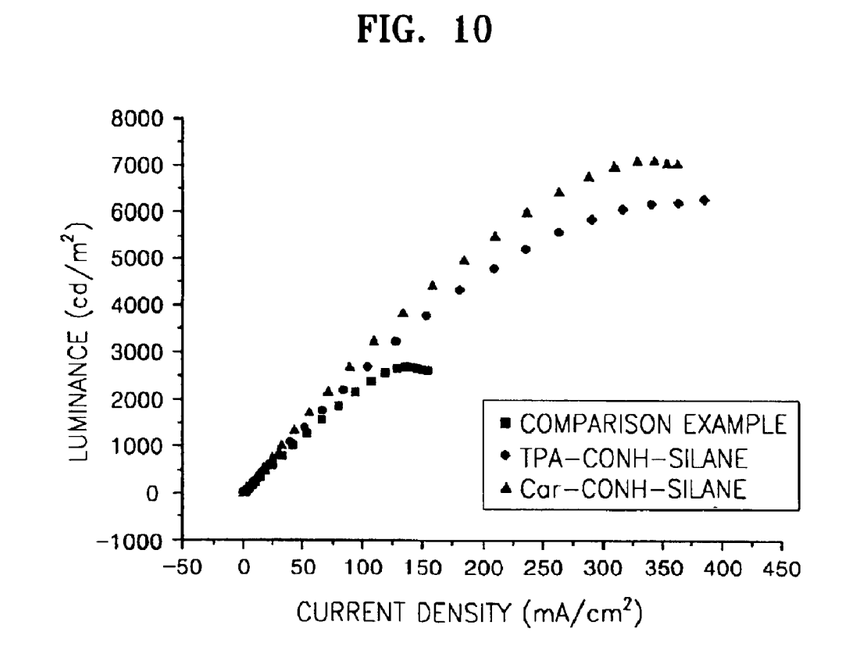
FIG. 10 is a graph showing the evaluation of electroluminescence efficiency of the organic EL device according to an embodiment of the present invention.
Figure 11:
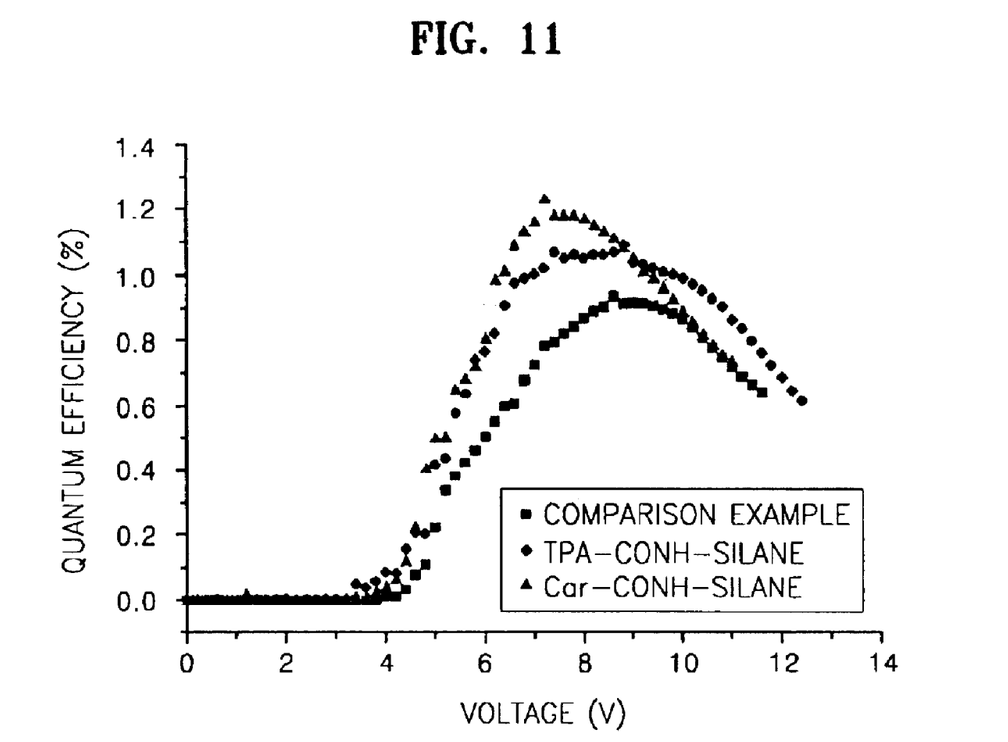
FIG. 11 is a graph showing the evaluation of quantization efficiency of the organic EL device according to an embodiment of the present invention.

The performances of the organic electroluminescent devices prepared in Examples 12 and 13 according to the present invention, as shown in FIGS. 8 and 9, were evaluated, and the results thereof are shown in FIGS. 10 and 11. Referring to FIGS. 10 and 11, the organic electroluminescent devices with the self-assembled monolayer 20 formed between the transparent electrode 12 and the hole transporting/injecting layer 22, are higher in performance than the organic electroluminescent device without the self-assembled monolayer 20 as in Comparison Example.

As described above, the compounds according to the present invention siloxane compounds including molecular components having excellent hole transporting capability. Thus, a self-assembled monolayer having a uniform thickness can be formed on the substrate surface using the compound of the present invention. The surface roughness of the thus-formed self-assembled monolayer can be maintained at a level of the substrate itself. Also, the organic EL device according to the present invention has the self-assembled monolayer interposed between hole transporting/injecting layers comprised of a transparent electrode and an organic thin film. Thus, adhesion between the transparent electrode and the organic thin film can be enhanced, and holes can be smoothly transported or injected from the transparent electrode serving as an anode to the organic thin film by varying the work function at the surface of the transparent electrode. Also, excellent stability with respect to heat and time, excellent electrical characteristics and high luminous efficiency can be attained.

Although the invention has been described with reference to particular preferred embodiments, it is to be understood that the invention is not limited to the particulars disclosed and extends to all equivalents within the scope of the claims.

What is claimed is:
1. A compound having the following structure wherein R' and R" are respectively a $C_1$ to $C_{22}$ alkyl group, X is an alkoxy group or halogen, and Ar is a functional group having hole transporting or injecting capability and has one formula selected from the group consisting of:

wherein $R_1$, $R_2$ and $R_3$ are independently and individually represent a hydrogen atom, an amine group having two-aryl group or substituted aryl group, or a $C_1$ to $C_{22}$ alkyl or alkoxy group.

2. The compound according to claim 1, wherein Ar has a structure having triphenylamine.

3. The compound according to claim 2, of the following formula:

wherein $R_1$ and $R_2$ are independently and individually represent a hydrogen atom, an amine group having two-aryl group or substituted aryl group, or a $C_1$ to $C_{22}$ alkyl or alkoxy group.

4. The compound according to claim 1, wherein Ar has a structure having carbazol.

5. The compound according to claim 4, of the following formula:

wherein $R_1$ represents a hydrogen atom, an amine group having two-aryl group or substituted aryl group, or a $C_1$ to $C_{22}$ alkyl or alkoxy group.

6. An organic electroluminescent device comprising:

an anode;

a hole transporting/injecting layer;

an organic light-emitting layer;

an electron transporting/injecting layer;

a cathode; and a self-assembled monolayer interposed between the anode and the hole transporting/injecting layer and having the following structure wherein R' and R" are respectively a $C_1$ to $C_{22}$ alkyl Ar group, is a functional group having hole transporting or injecting capability, and X is an alkoxy group or halogen.

7. The organic electroluminescent device according to claim 6, wherein the anode is indium tin oxide, indium oxide, tin oxide, zinc oxide or mixtures thereof.

8. The organic electroluminescent device according to claim 6, wherein Ar has one formula selected from the group consisting of:

wherein $R_1$, $R_2$ and $R_3$ are independently and individually represent a hydrogen atom, an amine group having two-aryl group or substituted aryl group, or a $C_1$ to $C_{22}$ alkyl group.

9. The organic electroluminescent device according to claim 6, wherein the self-assembled monolayer contains a compound of the following formula:

wherein $R_1$ and $R_2$ are independently and individually represent a hydrogen atom, an amine group having two-aryl group or substituted aryl group, or a $C_1$ to $C_{22}$ alkyl or alkoxy group.

10. The organic electroluminescent device according to claim 6, wherein the self-assembled monolayer contains a compound of the following formula:

wherein $R_1$ represents a hydrogen atom, an amine group having two-aryl group or substituted aryl group, or a $C_1$ to $C_{22}$ alkyl or alkoxy group.

11. The organic electroluminescent device according to claim 6, wherein the self-assembled monolayer consists essentially of a single compound of the formula:

12. The organic electroluminescent device according to claim 6, wherein the self-assembled monolayer includes two or more compounds of the formula:

* * * * *